May 5, 1959
R. NOWACK ET AL
FLUID PRESSURE OPERATED ROTATION
RESPONSIVE CONTROL DEVICE
Filed Dec. 2, 1955
2,885,171
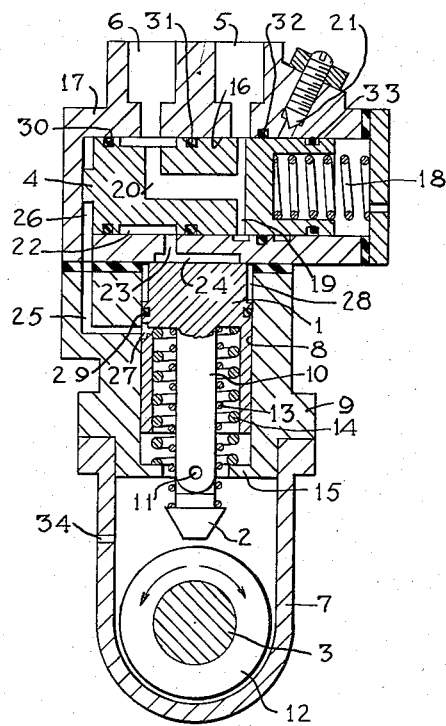
INVENTORS
Rudi Nowack
BY Wilhelm Bachmann
Adelbert A. Steinmiller
ATTORNEY

United States Patent Office 2,885,171
Patented May 5, 1959

2,885,171

FLUID PRESSURE OPERATED ROTATION RESPONSIVE CONTROL DEVICE

Rudi Nowack and Wilhelm Bachmann, Hannover, Germany, assignors to Westinghouse-Bremsen-Gesellschaft, m.b.H., Hannover, Germany Application December 2, 1955, Serial No. 550,698

Claims priority, application Germany March 4, 1955

8 Claims. (Cl. 251—13)

This invention relates to fluid pressure operated rotation-responsive control devices and has particular relation to fluid pressure, cyclically operated rotation-responsive control devices by means of which the pressure of fluid in a control pipe, for example, can be controlled automatically, dependent upon an existing relative movement between two bodies, so that said pressure will not exceed a previously established value as long as such relative movement exists between a body which is to be controlled and a member which is to be influenced by another previously established value of the fluid pressure, the highest possible pressure in said pipe being attainable only when said relative movement is non-existent. This control arrangement is especially adaptable for preventing increase in pressure where there is rotation of a shaft against which a feeler member may be forced. A preferred field for utilization of this type of control device, for example, is found with the mechanical switch arrangements in power transfer systems which are activated by pressure means.

There are some control devices of the above-described type which, although they use a feeler member, do not provide for cyclical operation for controlling fluid pressure in the control pipe whenever the control shaft is rotating. If the prerequisite for a cycling movement is not present, whereby the transmission of fluid pressure to an operating cylinder, for example, may be controlled as above described, the operation of the device must provide for an additional impulse in order to renew the activation of the feeler member. These existing control devices do attempt to provide an intermittent movement of the feeler member, but it is not always positively attained. Rather, more often there is the danger that the piston which is associated with the feeler member remains in an intermediate position and thus the desired switching is not effected.

The principal object of this invention is to provide a control device, which, after cutting-in of a fluid pressure circuit as by means of a starting valve, for example, insures positive operation of a control switch which is connected with a feeler member and which moves back and forth automatically and thereby prevents increase of fluid pressure over a predetermined value in a portion of the fluid pressure circuit as long as the stroke of the control piston is not limited by the feeler member.

Other objects of the invention will become more apparent by the following more detailed description thereof when read in conjunction with the single figure drawing which is an elevational diagrammatic view, mostly in section, of a fluid pressure operated rotation-responsive control device.

According to the invention, therefore, the fluid pressure control device for switch movement consists of a control piston 1 having associated therewith a feeler member 2 so arranged as to permit varying degrees of reciprocating movement of said control piston according to the movement of a body which is adapted to be moved, such as a rotating shaft 3, for example. A switch or pilot piston 4 is interposed between the control piston 1 and two fluid pressure connections in the casing of the device, one of which connections is an inlet connection 5 and the other an outlet connection 6. The pilot piston 4 is acted upon by fluid pressure and, upon maximum movement of the control piston 1, as permitted by the feeler member 2, said pilot piston reverses to effect exhaust of fluid pressure acting on the control piston which returns to a normal position. When the control piston 1 is in its normal position, pressure acting on the pilot piston 4 is also exhausted to thereby effect return of said pilot piston to a normal position so that the initial condition of the device is again established. The described cycle, which will be more fully described hereinafter, repeats as long as fluid pressure is supplied to the control piston 1 and the feeler member 2 permits maximum movement of said control piston.

According to the preferred form of the invention, the control piston 1, in its normal position, connects one side of the pilot piston 4 with atmospheric pressure, but, upon maximum movement of the control piston, said one side of the pilot piston is disconnected from atmosphere and connected to the inlet connection 5 of fluid pressure supply. By the same token when the pilot piston 4 is in its normal position, one side of the control piston is connected to fluid pressure, and, upon reversal of the pilot piston, said side of the control piston is connected to atmosphere.

Additional, according to the invention, an intermittent operation of the control piston 1 and its associated feeler member 2 is also effected. In order to illustrate the invention, it will be described as used in connection with the rotatable shaft 3, for example, which is to be controlled.

The rotation responsive control device comprises a housing of several sections, a section 7 of which surrounds the shaft 3 which is to be controlled. The control piston 1 is slidably operable in a bore 8 provided in a housing section 9 to which the housing section 7 is suitably attached by means not shown. A follower stem 10 has one end attached to one side of the control piston 1 and extends coaxially away therefrom to carry at its opposite end, in pivotal relation by means of a pin 11, the feeler member 2 which, when the control piston 1 is in its normal position, rests in a position just short of contact with a flange 12 surrounding the shaft 3. A spring 13, compressed between the piston 1 and the feeler member 2, holds said feeler member in a central normal position, in which it is shown in the drawing, but permits rocking of said feeler member about the pin 11, in the direction of either the left or right hand, upon engagement of the flange 12 by the feeler member when the shaft 3 is rotating in either a counterclockwise or clockwise direction, respectively, as viewed in the drawing. A spring 14 compressed between the control piston 1 and a shoulder 15 formed on the housing section 9, normally maintains the control piston 1 in its normal or upper position, as shown in the drawing, in which position the feeler member 2 is out of contact with the flange 12.

The pilot piston 4 is slidably operable in a bore 16 in a housing section 17 to which the housing section 9 is suitably attached by means not shown. A spring 18 acts to bias the piston 4 toward its normal position, to be hereinafter described, in which it is shown in the drawing. The pilot piston 4 is provided with a passageway 19 opening to the inlet connection 5 when said pilot piston is in its normal position, and a passageway 20 constantly open to the passageway 19 and connecting with the outlet connection 6 when the pilot piston 4 is in its normal position. The inlet connection 5, as previously noted, is connected to a source of fluid under pressure such as a reservoir, for example, which is not shown, while the outlet connection 6 may be connected to an operating cylinder (not shown) provided for some specific purpose. A screw-type adjustable choke 21 opening to atmosphere, the purpose of which is to be hereinafter described, is provided in the housing section 17.

An annular groove 22 formed in the pilot piston 4 and to which the passageway 20 opens, registers with the outlet connection 6 when said pilot piston is in its normal position, and constantly registers with a passageway 23 formed in the casing section 17 and leading to a chamber 24 at the upper side of control piston 1 opposite the side of stem 10. A passageway 25 is cooperatively formed in the casing sections 17 and 9 for connecting a chamber 26 at the side of pilot piston 4 opposite spring 18 with the lower side of control piston 1 adjacent the stem 10, by way of a port 27 formed in the wall of said control piston, when the control piston is in its normal position, said passageway being so arranged and formed in the casing that, upon movement of the control piston 1 downwardly out of its normal position to an operating position, which will hereinafter be described, said passageway serves to connect chamber 26 to chamber 24 by registering with an annular space 28, provided by an undercutting of the upper portion of the control piston 1, which space opens to chamber 24.

An O-ring 29, suitably disposed in a groove formed in the control piston 1, has sealing and sliding contact with the wall of bore 8 to prevent leakage from chamber 24 to the opposite side of piston 1.

Sealing O-rings 30 and 31 disposed in suitable grooves formed in the pilot piston 4 and located, respectively, between chamber 26 and annular groove 22 and between annular groove 22 and passageway 19, prevent leakage of fluid pressure between the described points. A sealing O-ring 32, disposed in a suitable groove formed in the casing section 17, has sliding contact with the pilot piston 4 to prevent leakage between the inlet connection 5 and the choke 21. Another O-ring 33, disposed in a suitable groove formed in the pilot piston 4, is located between the choke 21 and the side of said piston adjacent spring 18 to prevent leakage of fluid pressure therebetween.

In operation, let it be assumed that the shaft 3 and, therefore, the flange 12 are rotating, and that fluid under pressure is supplied to the inlet connection 5. Fluid under pressure will flow from the inlet connection 5, through the passageways 19 and 20 to the annular groove 22, and thence to the outlet connection 6 and the passageway 23 leading to the chamber 24 at the upper side of control piston 1. The pressure of fluid in chamber 24 acting on piston 1 will cause said piston to move downwardly against the opposing force of spring 14, the tension of said spring being so measured as to permit compression thereof by pressure of fluid acting on piston 1 at a pressure value substantially below that necessary for operating the operating cylinder (not shown) connected to the outlet connection 6. Upon downward movement of the control piston 1, the feeler member 2 will contact the rotating flange 12, and at this initial point of contact the passageway 25 will not yet be in registry with the annular space 28, since the piston 1 will not have moved sufficiently downwardly, but will be lapped in relation to port 27. Upon engagement of the feeler member 2 with the rotating flange 12, however, the rotation of said flange, in either direction, will rock said feeler member about the pin 11 accordingly to thereby permit further downward movement of the control piston 1 by the pressure acting thereon, until the feeler member 2 is resting on its side against the rotating flange 12. In this position of the feeler 2 the control piston 1 is in its furtherest downward point of movement or in its operating position, in which the passageway 25 is in registry with the annular space 28. Fluid under pressure may then flow from chamber 24, by way of passageway 25, to chamber 26 to thereby cause movement of the pilot piston 4 out of its normal position, in the direction of the right hand as viewed in the drawing, to a cut-off position in which passageway 19, and therefore passageway 20, move out of registry with the inlet connection 5, said passageway 19 moving into registry with the port controlled by choke 21. With the pilot piston 4 in its cut-off position, flow of fluid under pressure to the outlet connection 6 and thereby the operating cylinder is discontinued. Also with the pilot piston 4 in its cut-off position, the annular groove 22, however, remains in registry with passageway 23 so that fluid under pressure in chamber 26 may exhaust therefrom by way of passageway 25 through chamber 24, passageway 23, annular groove 22, passageway 20, passageway 19 and out to atmosphere by way of choke 21. The pressure area of the pilot piston 4 and tension of the spring 18 are so calculated that movement of pilot piston 4 to its cut-off position is effected before sufficient fluid pressure may build up in the operating cylinder to effect operation thereof.

As a consequence of the exhausting of chamber 24, as above described, the spring 14 will return control piston 1 to its normal position, and thereby the spring 13, as a result of disengagement of the feeler member 2 with the flange 12, will reposition said feeler member in its central normal position. When the control piston 1 has again assumed its normal position, the passageway 25 will be in registry with the vent port 27 on the lower side of piston 1 to thereby permit exhaustion of chamber 26 by way of passageway 25, vent port 27 and an atmospheric port 34 in the casing section 7. With fluid pressure exhausted from chamber 26 the spring 18 will return pilot piston 4 to its normal position to complete one operating cycle of the rotation-responsive control device. As long as the shaft 3 and, therefore, the flange 12 continues to rotate, the cycle above described will repeatedly occur to prevent operation of the operating cylinder.

On the other hand, if the shaft 3 ceases to rotate, and pressure acting on piston 1 moves said piston and the feeler member 2 downwardly until said feeler member engages the non-rotating flange 12, upon such engagement with the non-rotating flange 12, the feeler member will remain in its central normal position, thereby limiting the downward movement of the control piston 1 so that said control piston will occupy what may be called an intermediate position in which the annular space 28 does not move into registry with passageway 25. The passageway 25 will be lapped by the control piston 1, and thereby prevent fluid under pressure from reaching chamber 26 by way of passageway 25 so that the pilot piston 4 will remain in its normal position.

This condition of the control piston 1 and pilot piston 4 will obtain as long as the shaft 3 fails to rotate and, therefore, fluid under pressure will flow from the inlet connection 5 by way of passageway 19, passageway 20, annular groove 22, outlet connection 6 to the operating cylinder to effect operation thereof.

If the shaft 3 starts to rotate once more, the feeler member 2 will be pivoted about the pin 11 on one side or the other, as above described, and a series of the above-described cycles will once again be effected to prevent operation of the operating cyclinder.

Having now described the invention, what we claim as new and desire to secure by Letters Patent is:

1. A control device comprising, in combination, a rotatable element, a casing provided with a fluid pressure inlet connection adapted to be connected to a source of fluid under pressure and a fluid pressure outlet connection which may be connected with a fluid pressure operable device to be controlled, a first piston member in said casing having one position in which communication is established between said inlet and said outlet connections and operable in response to fluid pressure to a cut-off position in which said communication is disestablished, a second piston member in said casing having a normal position in which said first piston member is relieved of fluid pressure and operable to an intermediate position, in which fluid pressure supply is cut off from said first piston member, and to an operating position in which the supply of fluid under pressure to said first piston member is effected, and a feeler member associated with said second piston member and cooperative with said rotatable element, when in a non-rotative state, to limit movement of said second piston member to said intermediate position, and, when rotating, to cause movement of said second piston member to its said operating position.

2. A fluid pressure operable rotation-responsive device comprising, in combination, a rotatable element, a casing having a fluid pressure inlet connection and a fluid pressure outlet connection and a first pressure chamber and a second pressure chamber, a first piston slidably operable, in response to fluid pressure in said first chamber acting on one side of said piston, to one position, in which said second chamber is opened to said first chamber, and, in response to relief of such pressure acting on said first piston, to a normal position, in which said second chamber is closed to said first chamber and opened to atmosphere, a feeler member pivotally supported at one end of a stem attached at its other end to the side of said first piston opposite said one side and extending coaxially away therefrom toward said rotatable element, a spring encircling said stem and compressed between said first piston and said feeler member for biasing the latter toward a central normal position in which said feeler member is in axial alignment with said stem, said feeler member being adapted, upon movement of said first piston toward its said one position, for engaging said rotatable element and limiting movement of said first piston to an intermediate position, in which said second chamber is closed to said first chamber and open to atmosphere when said rotatable element is in a non-rotative state, and being pivotable, when said rotatable element is rotating in either direction, in a direction determined by the direction of rotation of said rotatable element whereby said first piston is permitted to move to its said one position, a spring for returning said first piston to its normal position upon relief of fluid pressure acting thereon, a second piston slidably operable, in response to fluid pressure in said second chamber acting on one side of said second piston, to a cut-off position, in which a communication, through a passageway in said second piston, is disestablished between said inlet connection and said outlet connection and said first chamber is opened to atmosphere by way of an atmospheric opening in the casing, and, in response to relief of fluid pressure from said second chamber, to a normal position, in which said communication is established and said first chamber is closed to atmosphere and opened to said fluid pressure inlet connection, and spring means for returning said second piston to its said normal position upon relief of fluid pressure from said second chamber.

3. The combination defined in claim 2 further characterized in that the atmospheric opening in the casing is provided with an adjustable screw for adjusting the size of the opening and thereby the rate of escape of fluid pressure.

4. A control device for registering the rotation in either direction of a rotary element and the stoppage of rotation thereof, comprising a pilot valve element movable between two different positions in which it establishes respective communications through which fluid under pressure may be supplied to and vented from any receiving device desired to be controlled by the control device and in which pressure build-up is limited to predetermined value so long as said pilot valve element continues to cycle between said two positions, said pilot valve element being effective when it remains in one of said two positions longer than a certain time, such as occurs while cycling between said two positions, to cause build-up of fluid under pressure in the receiving device to a value above said predetermined value, means for biasing said pilot valve element to its said one position, fluid pressure responsive means for operating said pilot valve element to its said second position, a control valve element having one position in which it vents fluid under pressure from the fluid pressure responsive means and a second position in which it causes fluid under pressure to be supplied thereto, means for biasing said control valve element to its said one position, a second fluid pressure responsive means subject to a fluid pressure corresponding to that supplied to the receiving device for shifting the control valve element from said one position to said second position, and feeler means moved by said second fluid pressure responsive means into engagement with said rotary element for preventing movement of said control valve element to its second position so long as the rotary element is not rotating, and being moved by rotation of said rotary element upon engagement therewith so as to not prevent movement of the control valve element to its said second position.

5. A control device comprising, in combination, a rotatable element, a casing provided with a fluid pressure inlet connection adapted to be connected to a source of fluid under pressure and a fluid pressure outlet connection which may be connected to a fluid pressure operable device to be controlled, valve means having one position in which it establishes a first communication between said inlet and said outlet connections and being operable to a cut-off position in which said first communication is disestablished and a venting communication for said outlet connection is established, a piston operable in said casing for controlling said valve means, said piston having a normal position in which said valve means occupies its said one position and being operable in response to fluid pressure to a different position for operating said valve means to its said cut-off position, means for biasing said piston to its normal position, and a fluid pressure responsive control member in said casing movable responsively to the supply of fluid under pressure thereto from a first position, in which it causes a second communication to be established through which the pressure of fluid acting on said piston is relieved, to a second position, determined by engagement with said rotatable element while in a nonrotative state, in which it causes said second communication to be cut off, and to a third position, determined by engagement with said rotatable element while rotating, in which third position it causes a third communication to be established through which fluid under pressure is supplied to said piston.

6. A control device comprising, in combination, a rotatable element, a casing having a fluid pressure inlet connection and a fluid pressure outlet connection, a first piston member operable within said casing, rotation-responsive means movable with said first piston member and engageable with said rotatable element when the piston member is subjected to fluid pressure, said rotation-responsive means being rockable, upon engagement with and by rotation of said rotatable element, out of a central position coaxial with said first piston member for causing movement of said piston member to one position, biasing means for returning said first piston member, when relieved of fluid pressure, to a normal position and for restoring said rotation-responsive means to its central position, a second piston member having formed therein a passageway constantly open to said outlet connection and to a pressure chamber open to said first piston member and being connectable to either said inlet connection or to an atmospheric vent port in said casing, said second piston member being reciprocably operable within said casing, in response to relief and supply of fluid pressure therefrom and thereto, respectively, between a normal position, in which said passageway registers with said inlet connection, and a cut-off position in which said passageway registers with said atmospheric vent port, the relief and supply of fluid pressure to and from said second piston member being effected by said operation of said first piston member which has formed therein a passageway constantly open to said pressure chamber and being either closed to or open to said second piston member when said first piston member is either in its normal position or its said one position, respectively, whereby said first piston member and said second piston member are mutually cooperative in producing cyclical operation of said first and second piston members so long as said rotatable element is rotating, and means for biasing said second piston member to its normal position.

7. The combination defined in claim 6 wherein the first piston member comprises a piston subject to supply and relief of fluid pressure on one side and having arranged on the opposite side the rotation-responsive means which comprises a stem forming a part of and extending coaxially away from said piston toward the rotatable element, a feeler member carried at the end of said stem and pivotable relative thereto by rotation of and in a direction determined by the direction of rotation of said rotatable element, upon engagement of said feeler member with the rotatable element as effected by movement of said piston toward said rotatable element, in response to fluid pressure acting thereon, said pivotal movement of said feeler member being in a direction out of the linear path of travel of the piston for permitting movement of the first piston member to its said one position, a spring encircling said stem and compressed between said piston and said feeler member for biasing the latter to a central position upon relief of fluid pressure acting on said piston and return thereof to its normal position, and spring means for biasing the first piston member to its normal position upon relief of fluid pressure therefrom.

8. The combination defined in claim 6 further characterized in that the rotation-responsive means, in its central position, limits movement of the first piston member, when subjected to fluid pressure, to a position intermediate its normal position and the said one position, whereby said first piston member is prevented from moving to its said one position and said second piston member is thereby maintained in its said normal position.

No references cited.